United States Patent [19]

Blain et al.

[11] Patent Number: 4,691,625
[45] Date of Patent: Sep. 8, 1987

[54] CONTINUOUS PRETZEL DOUGH MANUFACTURE

[75] Inventors: William A. Blain, Spring Valley, N.Y.; John Zabrodsky, III, Somerville, N.J.

[73] Assignee: Nabisco Brands, Inc., Parsippany, N.J.

[21] Appl. No.: 621,741

[22] Filed: Jun. 18, 1984

[51] Int. Cl.[4] .................. B01F 15/04; A47J 37/12; B67D 5/62
[52] U.S. Cl. .................................. 99/348
[58] Field of Search .................. 99/348, 485, 483; 366/85, 84, 83, 69, 96, 97, 301, 144; 426/302

[56] References Cited

U.S. PATENT DOCUMENTS

| | | |
|---|---|---|
| 2,391,630 | 12/1947 | Kibler . |
| 2,661,103 | 12/1953 | Fay et al. . |
| 2,686,543 | 8/1954 | Fay et al. . |
| 2,713,833 | 7/1955 | Fay et al. . |
| 2,764,070 | 9/1956 | Fay et al. . |
| 2,936,557 | 5/1960 | Fay et al. . |
| 2,993,453 | 7/1961 | Fay et al. . |
| 3,119,352 | 1/1964 | Fay et al. . |
| 3,122,356 | 2/1964 | Erdmenger ........... 366/85 |
| 3,306,751 | 2/1967 | Appleby . |
| 3,384,494 | 5/1968 | Colby et al. . |
| 3,391,634 | 7/1968 | Williams et al. . |
| 3,419,250 | 12/1968 | Brennan . |
| 3,427,649 | 2/1969 | Fay et al. . |
| 3,618,902 | 11/1971 | Brennan . |
| 3,736,862 | 6/1973 | Cromelijnck . |
| 3,773,521 | 11/1973 | Tsen et al. . |
| 3,783,772 | 1/1974 | Fay et al. . |
| 3,876,815 | 4/1975 | Kurzius . |
| 3,934,040 | 1/1976 | Smerak et al. . |
| 3,935,807 | 2/1976 | Main et al. . |
| 3,976,791 | 8/1976 | Seiberlich . |
| 3,988,875 | 11/1976 | Fay et al. . |
| 4,013,234 | 3/1977 | Fay et al. . |
| 4,061,314 | 12/1977 | Shmader . |
| 4,212,609 | 7/1980 | Fay et al. . |
| 4,408,887 | 10/1983 | Yamaoka . |

OTHER PUBLICATIONS

Bakers Digest, vol. 57, No. 6, Nov.-Dec. 1983, pp. 11-17, Chicago, Illinois, D. R. Thompson: "Liquid Sponge Technology Applied to High-Speed Dough Mixing".
Matz, Cookie and Cracker Technology, AVI Publishing Company, Inc. (1968), at p. 147.

Primary Examiner—Robert W. Jenkins
Attorney, Agent, or Firm—Richard Kornutik

[57] ABSTRACT

A process and system are provided for the continuous production of a uniform density pretzel dough. The ingredients of the pretzel dough are continuously supplied to a continuous operating assemblage and the dough is continuously produced, utilizing a relatively short retention time in the mixer. Within the continuous operating assemblage are mixing units and conveying units in ratio of approximately three to one, respectively.

10 Claims, 4 Drawing Figures

CONTINUOUS DOUGH MANUFACTURING PROCESS
AND SYSTEM

CONTINUOUS PRETZEL DOUGH MANUFACTURE

TECHNICAL FIELD OF THE INVENTION

This invention relates to the manufacture and production of yeast leavened dough by an integrated, continuous process, including the continuous feeding of necessary components of the dough, the continuous mixing and conveying thereof, and the continuous discharging of the resulting thoroughly mixed, blended, and homogenized dough, for further treatment into a finished product. More specifically this invention relates to a process to continuously manufacture pretzel dough, and the apparatus to perform that process, in which the continuous pretzel manufacturing includes the automatic feeding of the raw ingredients into a continuous operating assemblage. In this assemblage both mixing and conveying units are present in a ratio of approximately 3 to 1. This process and apparatus give the baker control of the pretzel dough manufacturing steps which in turn allows him to produce a pretzel dough of consistent quality at a reduced manufacturing time.

BACKGROUND ART

The art of the production of food-grade dough is replete with different types and classifications of inventions dealing with dough production including simple techniques to relatively sophisticated procedures. However, the production of pretzel dough, or other yeast levened dough, as nearly as can be determined, has heretofore been accomplished by batch-type processes or operations, as opposed to a continuous dough production process.

Batch-type pretzel manufacturing is subject to inefficiencies which lead to inconsistent quality in the final product. The inefficiencies arise when a batch or quantity of raw ingredients are mixed into a dough. In commercial operations it is desirable to mix a large quantity of dough. This dough is then extruded into a pretzel shape and further processed. The time lapse between the extrusion of the initial portion of the dough to the last portion of the dough in a particular batch causes differences in the aging of the dough.

The differences and variations within a batch of dough are a result of a significant problem of gluten formation in batch operations. For example, if a pretzel dough in a batch prepared process is permitted to sit prior to submersion in the sodium hydroxide bath, it develops a substantial gluten structure which results in a brittle pretzel. In a batch operation, a large amount of dough is produced at one time. Once the dough is produced it is shaped by extrusion and then immersed or soaked into the sodium hydroxide bath. The portion of the batch, which is extruded last, is aged and can well result in a brittle product due to substantial gluten development. Texture variations due to aging are also noticeable in the surface of the final product. Instead of a shiny, "glassy" appearance, the pretzel surface will have a cracked or "shattered glass" appearance. A cracked surface causes more rapid staling and reduces the shelf life of the product.

When aging differences from large batch operations for making pretzels are eliminated by producing numerous smaller batches of pretzel dough, variances between batches can exist. This also causes inefficiencies in the amount of time, equipment, and man hours required to constantly have a batch of dough mixed and prepared for extrusion and finalization of the product.

In commercial operations finishing of the product after the pretzel dough has been prepared by a batch operation includes taking a small piece of dough and then extruding and rolling it into a desired length. It is then twisted and dropped onto an elongated belt. The dough is passed through a specially prepared hot caustic solution which gives it a golden brown color and shiny finish. Salt is then dropped on the pretzel and it is passed through an oven. By the time it comes out of the oven the pretzel is completely baked. The baked pretzel is then allowed to dry to complete the extraction of as much moisture as possible. The pretzel is then ready for packaging.

There are many variations on this basic procedure, some directed to pretzel products and others to related snack-type products. For instance, in U.S. Pat. No. 3,876,815, a process for preparing a soft pretzel is disclosed, which includes the steps of mixing vinegar with pretzel dough prior to shaping the dough into the desired pretzel shape. The shaped dough is then refrigerated for about 30 minutes at 32° F. and thereafter dipped into a caustic solution, such as sodium hydroxide, to obtain the desired color and finish. The dipped dough is then baked at about 550° F. for about 7 minutes, during which time maximum expansion of the dough is achieved.

In U.S. Pat. No. 3,976,791 a process is disclosed for producing a pretzel product which, upon cooking, remains soft for an extended period of time, typically greater than twelve hours. The process involves preparing a dough comprising by weight, 51 parts water, 100 parts flour, and sufficient yeast to cause the dough to rise. The dough is then formed into the shape of a pretzel. The surface of the formed pretzel is then saturated with sodium hydroxide solution and thereafter cooled to a temperature below −15° F. for at least one hour.

Further prior art teachings pertaining to the art of pretzel manufacture are contained in Matz, *Cookie and Cracker Technology,* AVI Publishing Company, Inc. (1968), at page 147, which is incorporated herein by reference.

One prior art teaching, namely U.S. Pat. No. 3,384,494 is stated to relate to the preparation of a dry, free-flowing pastry crust mix prepared on a continuous or semi-continuous basis. This patent teaches a batch-fed mixing apparatus which can be operated continuously or semi-continuously. The product that is produced by this patent is a dry free-flowing mixture of basically two ingredients, flour and shortening. The process claimed to produce this pastry crust mix, involves temperature criteria and mixing variations not required in the production of pretzels.

SUMMARY OF THE INVENTION

The invention is a method, and an apparatus to perform the method, of continuously manufacturing a uniform density dough. The apparatus has at least one feed source into a continuous operating assemblage for a variety of raw ingredients to make the dough. The raw ingredients and resultant dough pass through the continuous operating assemblage which has at least one mixing component and at least one conveying component. The mixing component and conveying component each have multiple mixing units and conveying units. It is in this assemblage that the raw ingredients are mixed into a uniform density dough. The uniform density dough is then discharged at a steady rate from the apparatus. The uniform density dough, produced by the continuous operating assemblage is transported to an extruder for shaping into a pretzel form. The extruded dough then undergoes a curing or "skinning" process, in which the outer layer of dough is hardened to prevent excessive sodium hydroxide penetration. Treating of the extruded dough into a mild alkaline metal hydroxide solution, such as sodium hydroxide, occurs after the skinning process. Topping of the extruded dough with granular salt and baking of the dough then follow.

In the preferred embodiment of the invention, a pretzel dough of uniform density is made by continuously feeding and admixing flour and shortening in the front end sections of a continuous operating assemblage, which is a substantially horizontally-disposed, intensive mixer having both mixing units and conveying units. Thereafter, a premixed aqueous solution of yeast, malt, and salt is continuously fed to said mixer in a following section, but still in the front end of the assemblage and admixed with the flour-shortening mixture. The shortening is admixed with the flour first to assure a more uniform blend. In this manner, avoidance of the water acting as a barrier to absorption of shortening by the flour is accomplished. The ratio of mixing units and conveying units within the continuous operating assemblage has been found to be significant to the quality of the final product. Ratios of about three mixing units to one conveying unit, produce a pretzel dough of high quality and uniform density. A residence time in the preferred embodiment of the assemblage of 1 to 3 minutes allows for proper mixing of the dough.

The objectives achieved by this invention over the batch operations of the prior art used in the commercial production of pretzels and similar snack foods include the provision of a truly continuous operation, in which the dough is produced at a steady rate. As a result of producing each portion of the dough at a steady rate, inconsistencies from dough aging within a batch or between batches are eliminated. This invention allows for the efficient production of pretzel dough in an efficient process not requiring the continuous production of numerous small batches of dough. The resultant product of this invention has a consistent, high quality. Also included as an objective of this invention is the continuous production of a uniform density dough with an effective "kneading" action. It has been found that a continuous mixer or processor which effectively mixes the dough over a relatively short residence or retention time achieves this objective. For purposes of this invention the term, mixing, includes actions of kneading, blending, and/or shearing.

DETAILED DESCRIPTION OF THE INVENTION

Figure 1:
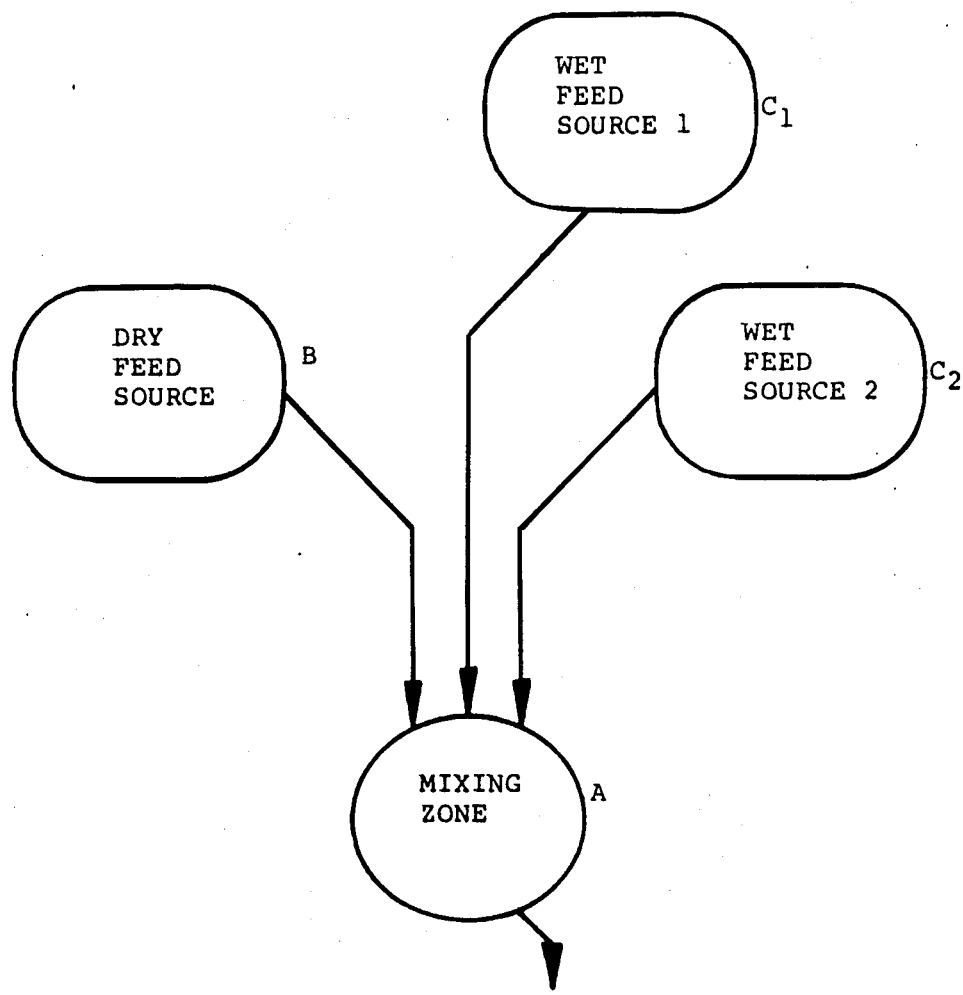
FIG. 1 is a diagrammatic showing of the invention and inter-relation of the main components thereof.

The method and the apparatus to perform the method of this invention involve the feeding of various raw ingredients to make a dough into a continuous operating assemblage. The raw ingredients include flour, shortening, and an aqueous solution including malt and yeast. Within the continuous operating assemblage are units which mix the dough, and separate units which convey the dough through the assemblage. Upon exiting the assemblage the dough is transported to an extruder. In the preferred embodiment the dough is pretzel dough and can be extruded or "tied" into a pretzel shape. After this, the pretzels are transported through a curing or "skinning" process to harden their exterior surface prior to dipping into an alkali metal hydroxide solution, such as sodium hydroxide. Baking and packing steps then follow.

The formulation of ingredients used in the continuous process and system of the present invention is not novel. Essentially the same formulation that is used in batch operations can be used in the continuous operation. With pretzel dough the formulation would typically include, by weight or other convenient measurements, flour, shortening, water, yeast, malt, and salt. The pretzel dough formulation can be varied so as to produce soft or hard pretzels. The continuous process and system of the present invention is not dependent on any particular or special formulation of raw ingredients. A typical formulation for use in the continuous production of pretzel dough is presented in Table I.

TABLE I

| Raw Ingredients | Twist lb | Stick lb |
| --- | --- | --- |
| Flour | 100 | 100 |
| Shortening | 1–5 | 2½–5 |
| Malt | 1–5 | 2½–5 |
| Yeast | ¼–⅜ | ¼–⅜ |
| Water | 35–55 | 35–55 |
| Salt | 0–½ | 0–½ |
| Optional: | | |
| Ammonium bicarbonate | ½ oz. | 2½ oz. |
| Sodium bicarbonate | 1.8 oz | — |
| Yeast food | As required | |

For the production of a uniform density dough, it is preferred to use a continuous operating assemblage having a substantially, horizontally-disposed mixing barrel with a pair of side-by-side communicating cylindrical chambers, one parallel with the other, with two agitator assemblies, one in each chamber rotating in the same direction. The blades or elements of the first agitator assembly are maintained in a close clearance with the blades or elements of the second agitator assembly as well as with the walls of the barrel.

The elements or paddles on one agitator assembly are so disposed geometrically, with respect to the elements or paddles on the other agitator assembly, that the elements, which are preferably lenticular in shape, experience, as between the crests or peaks and the sides or flanks of the elements, motion in a mutually opposite direction, although the shafts of both agitator assemblies are rotating in the same direction. The rotation of the two agitator assemblies provides a continual variation in volume between the agitator elements or blades and the barrel in any given area of the entire unit. At the same time, the action of the agitators also creates an alternating compression and suction of the ingredients. This, in effect, moves the ingredients forward and backward, assuring a continual mixing and remixing within any given section. Also, the agitator assemblies provide an overall movement of the mass of the dough ingredients and/or the dough from the inlet to the outlet position of the assemblage.

Additional information pertaining to the type of continuous mixer that is preferably used in the present invention can be obtained by referring to U.S. Pat. Nos. 3,419,250 and 3,618,902, which are incorporated herein by reference. Mixers embodying the teachings of these patents are commercially available from Teledyne Readco, of York, Pa., under the trademark Readco.

A cursory reading of the aforementioned patents indicates that an enormous number of agitator blade or paddle variations to mix and to convey a dough are possible. It has been found that a specific ratio and arrangement of mixing and conveying units disposed along the shaft or shafts of the assemblage is preferred in order to continuously produce uniform density dough. More particularly, a mixing unit to conveying unit ratio of about 3 to 1 is preferred, with the shaft or shafts rotating over a normal operating range of about 95-105 RPM, and more preferably, about 98-100 RPM. In the preferred embodiment this range of rotations per minute neither under mixes or over mixes the dough and maintains a dough residence time within the assemblage of between 1 to 3 minutes.

An example of the arrangement of mixing and conveying units along their shafts would be MMMCMMMC, where "M" is the abbreviation for the mixing element, and "C" is the abbreviation for the conveying element. Other arrangements of the "M" and "C" units can be used, but for optimum results the ratio of the M to the C units should be about 3 to 1. It was found, for example, that a 2 to 1M to C ratio was unacceptable. At this ratio there is incomplete mixing of the dough. A 4 to 1M to C ratio results in overmixing and a stringy dough.

Acceptable arrangements of M to C units manufactured as identified and described above include MMMCMMC, MMCMMMC, and MMMCMMMC. In other words, alternative embodiments of continuous operating assemblages include those with (1) three mixing units, followed by one conveying unit, followed by two mixing units, followed by one conveying unit or (2) two mixing units, followed by one conveying unit, followed by three mixing units, followed by one conveying unit. The preferred arrangement is three mixing units, followed by one conveying unit, followed by three mixing units, followed by one conveying unit. Continuous operating assemblages equivalent to this invention can have variations in the actual type and number of mixing or conveying units used.

Referring more particularly to the processing within the continuous operating assemblage and to the drawings, a preferred embodiment of the invention includes the following process and system conditions. It has a typical production rate of about 18 to about 19 pounds per minute or about 1080 to about 1140 pounds per hour of the uniform density dough. The dough can be characterized as having a stiff to very stiff consistency, but still plastic, mixable, and flowable. The residence time of the dough in the continuous operating assemblage is about 1 minute. The temperature at the exit or discharge point of the continuous operating assemblage is about 85° to 90° F. In the continuous process and system of the invention a first liquid, an aqueous mixture of yeast, malt, and salt, and a second liquid, a shortening are each slaved to an amount of flour fed to the assemblage by a K-tron feeder and control system. In other words, the amount of flour determines the amount of water premix and amount of shortening. A mass flow meter is used to measure flow of the ingredients. With the mass flow meter setup, measurement of mass flow is detected for the K-tron controller. In turn, the controller provides a signal to a positive displacement pump which adjusts the flow rate to the proper amount. The flow rate of the flour can also be adjusted depending on the feed rate desired for the oven. Preferably, the aqueous mixture of yeast, malt, and salt is supplied from two supply tanks, which can operate simultaneously before either of them is shut down. In this manner, air pockets in the aqueous mixture supply line are avoided.

With reference to FIG. 1, the process and system of the present invention can be viewed as comprising a strategically located continuous operating assemblage in mixing zone A. To this a dry feed of flour, from a dry feed source B, a first wet feed of shortening from wet feed source $C_1$, and a second wet feed of the aqueous mixture from wet feed source $C_2$ are continuously fed. The various feeds or dough-forming ingredients enter a mixing zone in the spatial relationship shown. The resultant dough is continuously discharged after intensive mixing in the continuous operating assemblage.

The temperatures of the dough upon discharge from the continuous operating assemblage is maintained below about 95° F. and preferably below 90° F. The assemblage in the preferred embodiment is water cooled. The purpose of the cooling of the assemblage is to prevent the heat formed by its operation from significantly adding to the temperature of the dough being mixed. If the dough temperature exiting the assemblage is allowed to rise above 95° F. it has too low a viscosity and begins to "run". It then becomes difficult to extrude into a pretzel shape.

The temperature of the raw ingredients upon entry into the assemblage varies depending upon the season of the year. This is because flour or other ingredients that are used shortly after being received at a plant have not had an opportunity to be warmed or cooled to room temperature. Additionally, where tap water is used, its temperature fluctuates according to variations in the weather. In the preferred embodiment of this invention the temperature of the water to the dough mix is varied to control the temperatures of the other raw ingredients entering the assemblage. For example, when the flour is cold or warm the admix water temperature is increased or decreased, respectively, to bring the overall mixture to between about 65° to 75° F. This prevents variations in the consistency and texture of the dough due to fluctuations in ambient temperatures.

Figure 2:
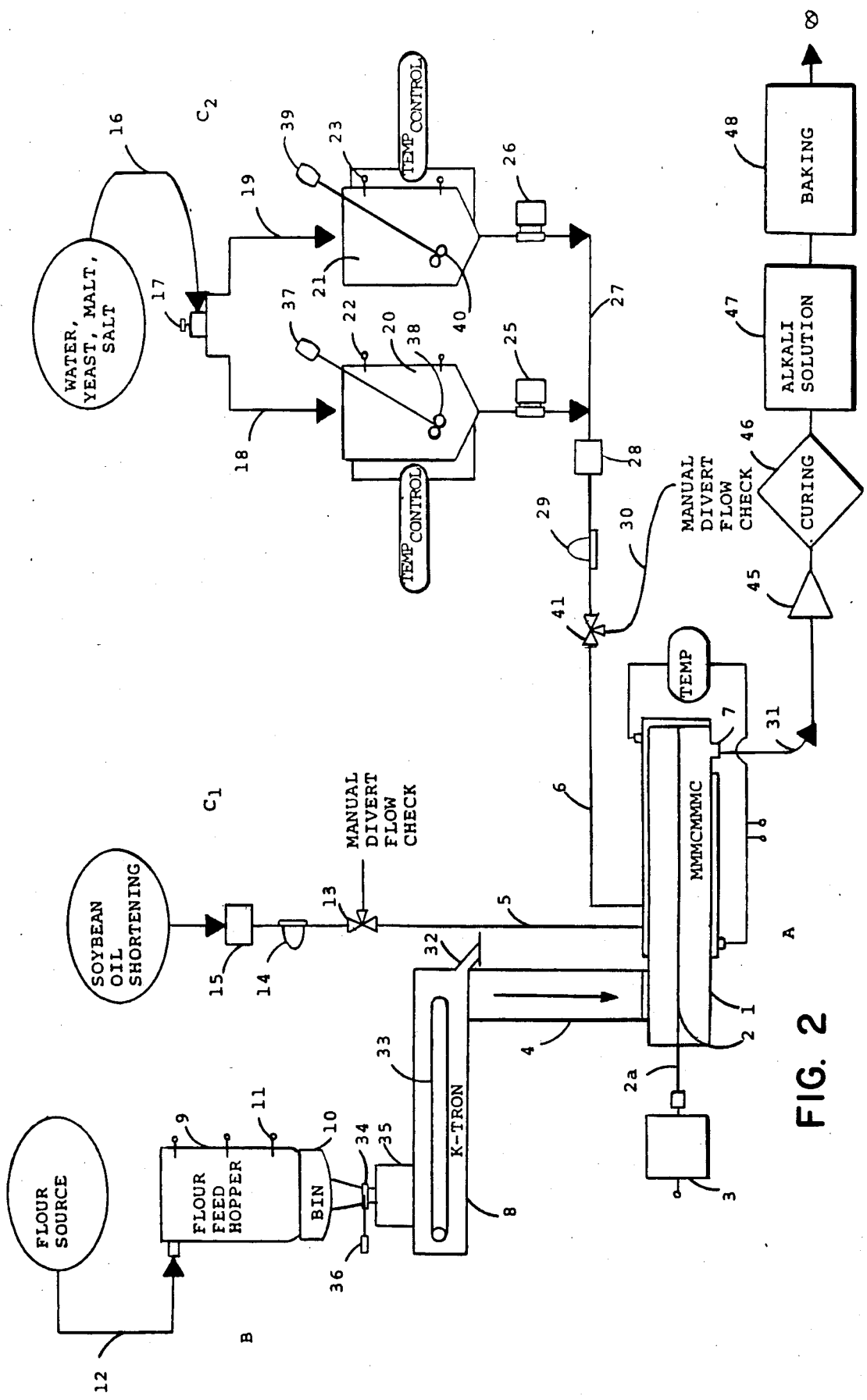
FIG. 2 is a detailed flow diagram illustrating a preferred set of components for the satisfactory continuous production of uniform density dough.

Referring to FIG. 2, section A corresponds to the mixing zone in FIG. 1. Section B, which contains the flour hopper, corresponds to the dry feed source in FIG. 1. Section $C_1$, the soybean oil shortening supply, corresponds to wet feed source $C_1$ of FIG. 1. Section $C_2$, containing the supply tanks 20 and 21 and associated items, corresponds to wet feed source $C_2$ of FIG. 1.

Figure 3:
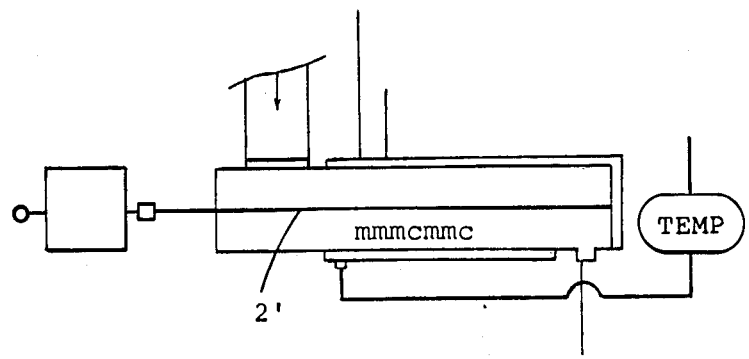
FIG. 3 illustrates an alternative embodiment of the agitator assembly of the invention.
Figure 4:
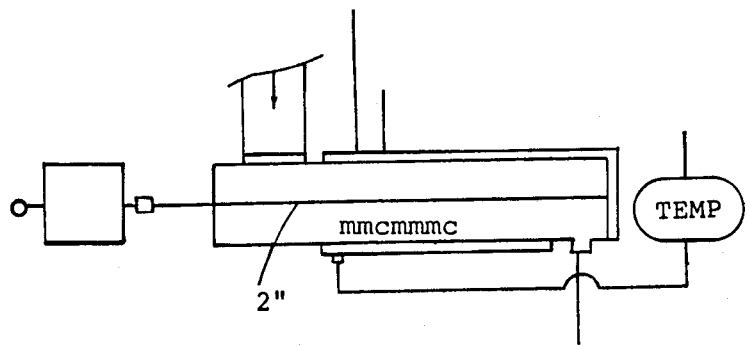
FIG. 4 illustrates an alterntive embodiment of the agitator assembly of the invention.

The intensive mixer or continuous operating assemblage 1 is shown. The agitator assembly 2 runs lengthwise along the horizontally-disposed assemblage 1 and having mixing units and conveying units assembled on a rotating shaft 2a, which is driven by motor 3. The vertically disposed chute 4 conducts the flour to an entrance into the assemblage 1 and is continually supplied by the K-tron feeder and control system 8. FIGS. 3 and 4 illustrate embodiments for arrangements of mixing units and conveying units as represented by agitator assembly 2' and agitator assembly 2".

Conventional instrumentation and control means (not shown) can be present to monitor and control the flour moving along conveyor belt 33. Housing 35 receives and confines the flour so that it may drop on conveyor belt 33, after passing through gate-controlled orifice 34, controlled by slide means 36.

The flour feed hopper 9, having dampers 11, is vertically disposed above the K-tron unit 8 and conveyor belt 33 and is continually supplied with flour from a main flour source (not shown) by air conveying through line 12. Hopper or bin 9 is shaken or vibrated by bin activator 10 to provide an even and uniform supply of flour to conveyor belt 33.

The shortening used in the preferred embodiment, illustrated in FIG. 2, can be soybean oil shortening. It is continuously supplied through line 5 to the mixer by means of positive displacement pump 15. The mass flow of the shortening is controlled by a mass flow meter 14. Examples of mass flow meters used in the preferred embodiment are those sold by the Micro Motion Company of Boulder, Colo. A globe valve 13 with a tee connection is provided in the event that the flow has to be checked by manual diversion. In a similiar manner, globe valve 41 with a tee provides a manual diversion flow check to line 30 for the aqueous mixture flowing through line 27 and then through line 6 into the intensive mixer or assemblage 1. The aqueous mixture is pumped from supply tanks 20 and 21 through valves 25 and 26 by the positive displacement pump 28. The flow of the aqueous mixture is controlled by mass flow meter 29. Water is supplied to the supply tanks 20 and 21 after being split into two streams 18 and 19 by valve 17. The yeast, malt, and salt mixture can be first added to the tanks 20 and 21 before or after the water is supplied, or it can be added simultaneously with the water. Propeller mixers 38 and 40, driven by motors 37 and 39, respectively, maintain the uniformity of the mixtures in supply tanks 20 and 21. The circle T and circle P symbols, as used on the flow sheet represent thermostats and flow control means in the various places designated. The uniform density dough 31 is discharged from the exit or discharge port 7 of the assemblage 1 and is then conveyed to the extruder. Upon exiting the assemblage 1 the uniform density dough is extruded by any suitable means for extruding 45. The extruded dough is then cured by a means for curing 46 whereby the outer surface of the dough hardens. The cured dough is then treated with an alkali metal hydroxide solution by a means for treating 47 said dough with an alkali solution. The treated dough is then baked by any suitable means for baking 48.

An extruder apparatus can include, as in the preferred embodiment, a means to form or "tie" the extruded dough into a pretzel shape. The extruded dough is laid on a conveyor and transported for 4 to 5 minutes to permit its outer surface to harden or form a "skin". This step is known as a skinning process. It occurs prior to dipping the dough into a mild solution of sodium hydroxide and prevents excessive penetration of the sodium hydroxide into the interior of the pretzel.

Usual concentrations of a sodium hydroxide bath can range between 1.2% to 1.8%, depending upon the desired pretzel shape. In the preferred embodiment a 1.7% sodium hydroxide solution is used for "tie" pretzels. With stick pretzels a 1.6 to 1.8% sodium hydroxide solution is often used. The pretzel dough is then sprinkled with topping salt and baked using oven temperatures and baking times standard in the art. Standard ranges for baking pretzels are between 430° to 530° F. for about 4 to 6 minutes.

FIG. 2 represents a preferred embodiment for the continuous production of uniform density pretzel dough, but as stated above, other doughs can also be made by the process and systems of the present invention.

EXAMPLE I

In the case illustrated specifically in FIG. 2, for the continuous production of pretzel dough, certified flour having a density of about 37 pounds per cubic foot is supplied at the rate of about 13 pounds per minute to the continuous operating assemblage. Soybean oil shortening, having a density of about 54 pounds per cubic foot at 120° F., is supplied to the assemblage at the rate of about 0.52 pounds per minute. The aqueous, yeast, malt, and salt mixture is supplied to the mixer at the rate of about 5 pounds per minute. This produces a continuous uniform density dough at the rate of about 18.5 pounds per minute at 87° F. with a relatively short retention time in the mixer of about 1 minute. The mixer units and conveying units are operated at 98 to 100 RPM to achieve this residence time.

While the present invention has been described with reference to particular embodiments, it will be understood that numerous modifications can be made by those skilled in the art without actually departing from the spirit and scope of the invention as defined in the appended claims.

What is claimed is:

1. An apparatus for continuous production of pretzels comprising:
   (a) at least one feed source for a variety of raw ingredients to make a dough;
   (b) a continuous operating assemblage having a plurality of mixing units and a plurality of conveying units, said mixing units and said conveying units being in a ratio of about 3 to 1, respectively, said assemblage being adapted to receive and mix said raw ingredients into a uniform density dough, said dough being discharged at a steady rate from said assemblage;
   (c) a means for extruding said discharged dough;
   (d) a means for curing an exterior layer of said discharged dough;
   (e) a means for treating said cured dough in an alkali metal hydroxide solution; and
   (f) a means for baking said treated dough.

2. An apparatus according to claim 1 wherein said continuous operating assemblage has three mixing units, followed by one conveying unit, followed by three mixing units, followed by one conveying unit.

3. An apparatus according to claim 1 wherein said continuous operating assemblage has three mixing units, followed by one conveying unit, followed by two mixing units, followed by one conveying unit.

4. An apparatus according to claim 1 wherein said continuous operating assemblage has two mixing units, followed by one conveying unit, followed by three mixing units, followed by one conveying unit.

5. An apparatus according to claim 1 wherein said continuous operating assemblage has a mass flow meter for controlling a flow rate of said dough to between about 18 to 19 pounds per minute.

6. An apparatus according to claim 1 wherein there is a liquid shortening feed source, an aqueous mixture feed source, and a dry flour feed source.

7. An apparatus according to claim 1 wherein said dough has a residence time within said continuous operating assemblage during operation of between 1 and 3 minutes.

8. An apparatus for continuous pretzel dough production comprising:
   a continuous operating assemblage having three mixing units, followed by one conveying unit, followed by three mixing units, followed by one conveying unit, said continuous operating assemblage being adapted to simultaneously mix and convey pretzel dough, said continuous operating assemblage rotating over a normal operating range of about 95 to 105 revolutions per minute and maintains a dough residence time within said continuous operating assemblage of between 1 to 3 minutes.

9. An apparatus for continuous pretzel dough production comprising:
   a continuous operating assemblage having three mixing units, followed by one conveying unit, followed by two mixing units, followed by one conveying unit, said continuous operating assemblage being adapted to simultaneously mix and convey pretzel dough, said continuous operating assemblage rotating over a normal operating range of about 95 to 105 revolutions per minute and maintains a dough residence time within said continuous operating assemblage of between 1 to 3 minutes.

10. An apparatus for continuous pretzel dough production comprising:
    a continuous operating assemblage having two mixing units followed by one conveying unit, followed by three mixing units, followed by one conveying unit, said continuous operating assemblage being adapted to simultaneously mix and convey pretzel dough, said continuous operating assemblage rotating over a normal operating range of about 95 to 105 revolutions per minute and maintains a dough residence time within said continuous operating assemblage of between 1 to 3 minutes.

* * * * *